US011087192B2

(12) United States Patent
Amisar

(10) Patent No.: US 11,087,192 B2
(45) Date of Patent: Aug. 10, 2021

(54) SYSTEMS AND METHODS FOR EQUIPMENT SERVICES

(71) Applicant: GENERAL ELECTRIC COMPANY, Schenectady, NY (US)

(72) Inventor: Gil Amisar, Haifa (IL)

(73) Assignee: General Electric Company, Schenectady, NY (US)

( * ) Notice: Subject to any disclaimer, the term of this patent is extended or adjusted under 35 U.S.C. 154(b) by 125 days.

(21) Appl. No.: 15/973,975

(22) Filed: May 8, 2018

(65) Prior Publication Data

US 2019/0347532 A1    Nov. 14, 2019

(51) Int. Cl.
*G06F 17/00*    (2019.01)
*G06K 19/06*    (2006.01)
*G05B 15/02*    (2006.01)
*G06F 21/36*    (2013.01)

(52) U.S. Cl.
CPC ....... *G06K 19/06037* (2013.01); *G05B 15/02* (2013.01); *G06F 21/36* (2013.01)

(58) Field of Classification Search
CPC .......... G06F 11/32; G06F 21/31; G06F 21/46; G06F 21/36; G06K 7/0095; G06K 7/1096; G06K 7/10732; G06K 7/1417; G06K 7/1452; G06K 9/00255; G06K 9/00288; G06K 9/00791; G06K 19/06037; G06K 9/00221; G06K 9/00228; G06K 9/6256; G05B 23/0291; G05B 9/02; G05B 9/03; G05B 15/02
See application file for complete search history.

(56) References Cited

U.S. PATENT DOCUMENTS

| | | | | |
|---|---|---|---|---|
| 5,127,194 A | * | 7/1992 | Jobin | B24B 3/003 451/10 |
| 7,848,578 B2 | * | 12/2010 | Suomela | G06K 7/10712 382/232 |
| 8,896,544 B2 | | 11/2014 | Homma et al. | |
| 9,367,860 B2 | | 6/2016 | McKirdy | |
| 2008/0095441 A1 | * | 4/2008 | Rosskamm | G06Q 20/202 382/183 |
| 2012/0131416 A1 | * | 5/2012 | Dugan | G06F 11/32 714/760 |
| 2012/0303323 A1 | * | 11/2012 | Ha | G05B 23/027 702/183 |
| 2014/0061305 A1 | * | 3/2014 | Nahill | G06K 7/1096 235/438 |
| 2015/0067567 A1 | * | 3/2015 | Langsdorf | G06F 3/0484 715/771 |
| 2018/0060590 A1 | * | 3/2018 | Hosamane | G06F 21/575 |

* cited by examiner

*Primary Examiner* — Thien T Mai

(57) ABSTRACT

A piece of equipment that needs services may not have connectivity to a network. In an example method, an event triggers the piece of equipment to generate a barcode or QR code. The event may be installation of equipment, preventive maintenance, update of software, periodic calibration, abnormal operation, change of location, etc. The barcode or QR code contains information of the piece of equipment and the triggering event. The piece of equipment halts upon display of the barcode or QR code. An application installed in a user device scans the barcode or QR code and sends a message to a remote service center. The service center analyzes the message and updates a service database. The service center returns a key in a message back to the user device. When the key is input into the piece of equipment, the operation of the piece of equipment is resumed.

21 Claims, 4 Drawing Sheets

SYSTEMS AND METHODS FOR EQUIPMENT SERVICES

FIELD

This disclosure relates to systems and methods for equipment services.

BACKGROUND

Various types of equipment require services to ensure proper operation. For example, medical systems (e.g., x-ray, CT, MR) used in hospitals or clinics are serviced regularly by personnel who address operating problems, configure and calibrate the systems, and perform periodic checks and software updates. In recent years, computerized service centers have been used to remotely manage equipment services. For example, pieces of equipment are connected to the service center via the network (e.g., intranet, Internet). A variety of data, such as log information, configuration information, location information, operational information, etc., is collected from the pieces of equipment, transmitted to the service center via the network, and stored in a database of the service center. The service center can further analyze the data, evaluate system performance, propose or schedule visits by service personnel, and so on. In addition, the service center can facilitate enforcement of service activities on the pieces of equipment, such as activities prescribed by the facility maintenance institutes, scheduled maintenance, security updates, modifications such as Field Modification Instructions (FMIs) or upgrades, etc.

However, not every piece of equipment has connectivity to the service center—some may not have network interface for connecting to the Internet or other networks. Collecting data from those systems that do not have connectivity and enforcing activities (e.g., cyber security compliance) on the systems may be problematic. Thus, a method of collecting data from and enforcing activities on the systems that do not have connectivity to the network is generally desired.

BRIEF SUMMARY

In one embodiment, the present disclosure provides a piece of equipment comprising a code generator, a display, and an input device. The code generator is configured to generate a barcode or QR code in response to a triggering event. The barcode or QR code contains information of the piece of equipment and the triggering event. The display is configured to display the barcode or QR code. Operation of the piece of equipment halts upon display of the barcode or QR code. The input device is configured to receive an input of a key. Operation of the piece of equipment resumes upon input of the key.

In another embodiment, the present disclosure provides service center comprising a database and a server. The database stores information related to equipment services. The server is communicably connected to the database and configured to receive a message from a user device. The message contains information of a piece of equipment and a triggering event which happened to the piece of equipment. The server is further configured to analyze the message and update the database with the received message, generate a return message, and transmit the return message to the user device. The return message includes a key for putting the piece of equipment back to operation.

In still another embodiment, the present disclosure provides a method for equipment service. The method comprises generating a barcode or QR code in response to a triggering event. The barcode or QR code contains information of a piece of equipment and the triggering event which happened to the piece of equipment. The method further comprises displaying the barcode or QR code and halting operation of the piece of equipment upon display of the barcode or QR code, and receiving an input of a key and resuming operation of the piece of equipment resumes upon input of the key.

In yet another embodiment, the present disclosure provides a method for equipment service. The method comprises receiving a message from a user device. The message contains information of a piece of equipment and a triggering event which happened to the piece of equipment. The method further comprises analyzing the message and updating a database with the received message, generating a return message, and transmitting the return message to the user device. The return message includes a key for putting the piece of equipment back to operation.

BRIEF DESCRIPTION OF THE DRAWINGS

Various aspects of this disclosure may be better understood upon reading the following detailed description and upon reference to the drawings in which.

Figure 1A:
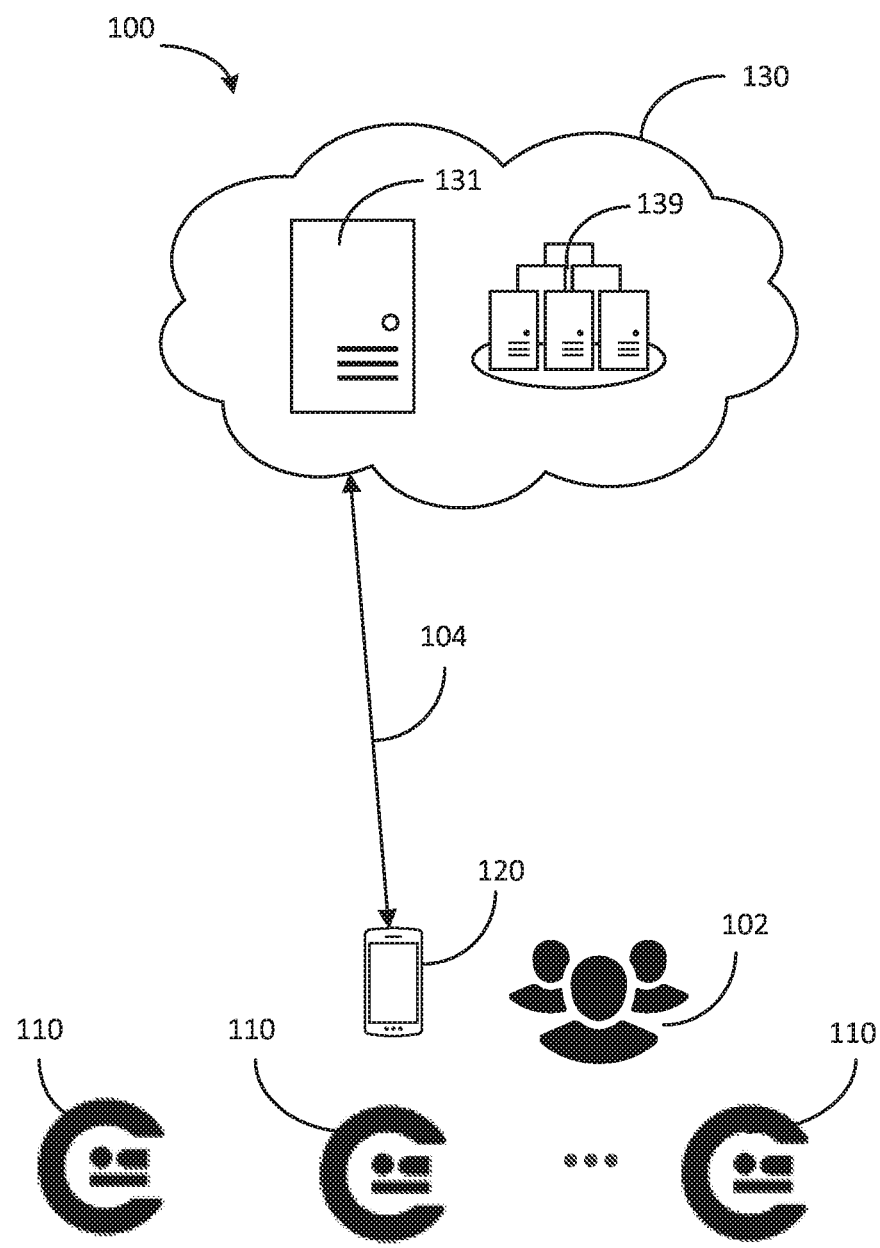
FIG. 1A is a schematic diagram of an environment for equipment services, in accordance with an exemplary embodiment.

The drawings illustrate specific aspects of the described components, systems and methods for equipment services. Together with the following description, the drawings demonstrate and explain the principles of the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

One or more specific embodiments of the present disclosure are described below in order to provide a thorough understanding. These described embodiments are only examples of the systems and methods for equipment services. The skilled artisan will understand that specific details described in the embodiments can be modified when being placed into practice without deviating the spirit of the present disclosure.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to,"

etc. are used herein, one object (e.g., a material, element, structure, member, etc.) can be connected to or coupled to another object regardless of whether the one object is directly connected or coupled to the other object or whether there are one or more intervening objects between the one object and the other object.

As used herein, the terms "system," "device," "module," etc., may include a hardware and/or software system that operates to perform one or more functions. For example, a module, device, or system may include a computer processor, controller, and/or other logic-based device that performs operations based on instructions stored on a tangible and non-transitory computer readable storage medium, such as a computer memory. Alternatively, a module, device, or system may include a hard-wired device that performs operations based on hard-wired logic of the device. Various modules, devices, and/or systems shown in the attached figures may represent the hardware that operates based on software or hardwired instructions, the software that directs hardware to perform the operations, or a combination thereof.

In addition, it should be understood that references to "one embodiment" or "an embodiment" of the present disclosure are not intended to be interpreted as excluding the existence of additional embodiments that also incorporate the recited features.

Referring to the figures generally, the present disclosure is to provide systems and methods for equipment services, such as collecting data from and enforcing activities on pieces of equipment. In some embodiments, the piece of equipment that needs services is not connected to the Internet or a proprietary network of an equipment manufacturer, an equipment seller, or a maintenance service provider. In an example method, an event triggers the piece of equipment to generate a barcode or QR code. The triggering event may include but is not limited to, for example, completion of installation of equipment, performance of preventive maintenance, update of software, periodic calibration and/or configuration of system, abnormal operation, change of location, etc. The barcode or QR code may contain information of the piece of equipment, such as the type and identification (e.g., serial number), location, status of operation (e.g., OK, error, etc.), as well as information of the triggering event, modification and/or updates, log history, etc. The barcode or QR code is presented on, for example, a display of the piece of equipment. The display may also prompt a message asking an operator to enter a key. In some embodiments, the piece of equipment halts before the key is entered.

The operator, upon seeing the barcode or QR code and the prompt message, activates an application installed in a user device (e.g., smart phone, laptop, tablet, etc.) to scan the barcode or QR code on the display. The application then generates a message which contains information derived from the barcode or QR code and sends the message to a server, e.g., a remote server of a service center. The server receives the message and analyzes the information carried by the message. The server may update the database of the service center with the information received. In some embodiments, if the message indicates that services have been properly performed on the piece of equipment, the server may send a key in a return message back to the user device. The operator can input the key to the piece of equipment to resume its operation. In some embodiments, if the message indicates that services have not been properly performed, or further intervention is needed, or the operation status was erroneous, the server may send instructions and/or warnings along with the key in the return message back to the user device. The operator can input the key to resume the operation and perform actions per the instructions/warnings received from the server.

Referring to FIG. 1A, a schematic diagram of an environment 100 for equipment services is shown, in accordance with an exemplary embodiment. As illustrated in FIG. 1A, various pieces of equipment 110 require services. In the context of, for example, medical equipment, the pieces of equipment 110 may include but are not limited to, for example, PET, SPECT nuclear camera, CT, MR, X-ray, etc. The pieces of equipment 110 may be made by the same or different manufacturers. It should be understood that although medical equipment is used as an example in this disclosure, the methods and systems disclosed herein may apply in any appropriate industries.

An operator team 102 performs services for the equipment 110, such as fixing operating problems, configuring and calibrating the systems, performing periodic checks and software updates, and so on. A service center 130 includes a database 139 for storing information of equipment services and a server 131 for analyzing the information and performing operations (e.g., providing instructions, scheduling service events, etc.) based on the information. In some embodiments, the service center 130 is located in the cloud, leveraging computing and storing capacities of the cloud. In some embodiments, at least some pieces of equipment 110 do not have connectivity to the Internet, or a proprietary network of an equipment manufacturer, an equipment seller, or a maintenance service provider. Therefore, these pieces of equipment 110 are not directly connected to the service center 130. A user device 120 is capable of communicating with the service center 130 via a network connection 104. The user device 120 may be, for example, a smartphone, a tablet, a laptop, or any other appropriate device used by the operator team 102. A same operator may use the same user device 120 at different pieces of equipment 110. The communication capability of the user device 120 is leveraged to collect data from the unconnected pieces of equipment 110 to the service center 130 and to enforce activities on the unconnected pieces of equipment 110.

Figure 1B:
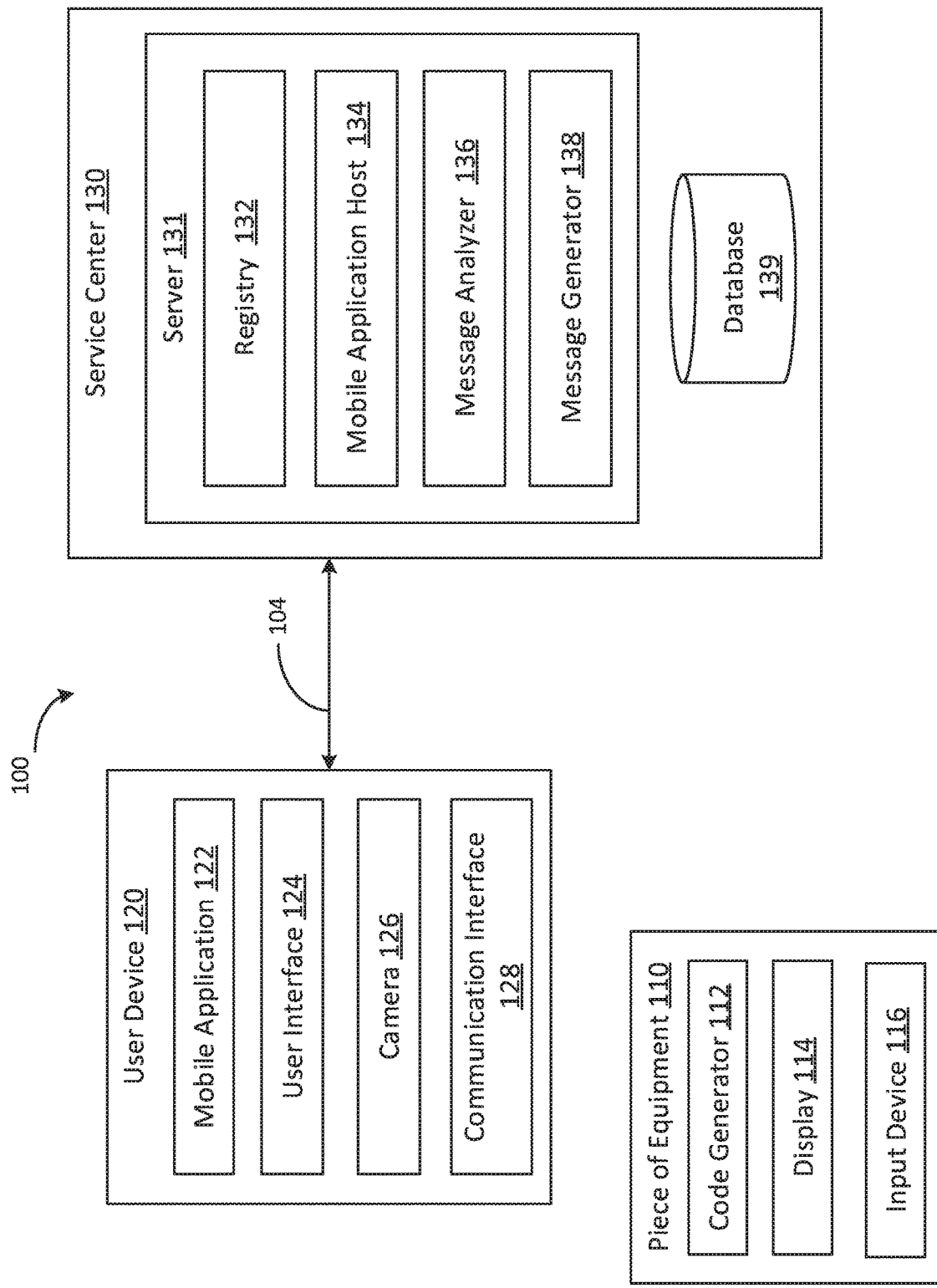
FIG. 1B is a block diagram of the environment for equipment services of FIG. 1A, in accordance with an exemplary embodiment.

FIG. 1B shows more details of each component of FIG. 1A in a block diagram, in accordance with an exemplary embodiment. As shown in FIG. 1B, in some embodiments, an example piece of equipment 110 comprises a code generator 112, a display 114, and an input device 116. The code generator 112 is configured to generate a barcode or QR code in response to an event. The triggering event may include performance of a service event, such as, completion of installation of equipment, performance of preventive maintenance, update of software, periodic calibration and/or configuration of system, change of location, etc. The triggering event may also include an upcoming service event. For example, the code generator 112 may be configured to generate a barcode or QR code when a periodic calibration is due in a week, three days, or one day. The triggering event may further include abnormal operation of the piece of equipment 110, for example, when an error occurs. The triggering events may be predefined and stored in the piece of equipment 110.

The generated barcode or QR code may contain information of the piece of equipment 110, such as the type and identification (e.g., serial number), location, status of operation (e.g., OK, error, etc.), as well as information of the operator (e.g., identification). The barcode or QR code may further contain information of the triggering event, such as the type of the triggering event (e.g., periodic calibration, updates of software, etc.), details of the triggering event (failure, success, partial failure), timestamp of when the triggering event occurred, etc. The barcode or QR code can be generated by any appropriate method known in the art. In some embodiments, the barcode or QR code includes authentication data for authenticating the piece of equipment 110, for example, credentials of the piece of equipment 110. In some embodiments, information contained in the barcode or QR code is encrypted. In some embodiments, no privacy related information is included to generate the barcode or QR code, such as patient information, images, clinical information, hospital personnel information and so on.

The display 114 may be a monitor or screen, which can display the barcode or QR code generated by the code generator 112, as well as information/instructions to the operator 102. For example, the display 114 may display the barcode or QR code along with a prompt message, instructing the operator 102 to input a key which is returned from the service center 130. The input device 116 may be a keyboard, touchpad, mouse, or any other appropriate device that the operator 102 can use to input data to the device 110. In some embodiments, the operator 102 inputs user name, password, or the like through the input device 116 for the piece of equipment 110 to authenticate the operator. In some embodiments, the display 114 and the input device 116 are integrated into one component, e.g., a touch screen.

Still referring to FIG. 1B, in some embodiments, the user device 120 comprises a mobile application 122, a user interface 124, a camera 126, and a communication interface 128. The mobile application 122, when activated by the operator 102, runs on the user device 120 and facilitates the operations disclosed herein. In some embodiments, the mobile application 122 is a web-based portal/application. In some embodiments, the mobile application 122 is downloaded by the operator 102 onto the user device 120 from a website such as Google Play, Apple Store, or a website of an equipment manufacturer, an equipment seller, or a maintenance service provider. In some embodiments, the operator 102 needs to register before activating the mobile application 122 for the first time, by providing, for example, a user name, password, phone number, email, and so on.

The user interface 124 may be a hardware device (e.g., touch screen) or a software program (e.g., graphical user interface) or a combination thereof. The user interface 124 for the mobile application 122 may be configured to help or guide the operator 102 in performing the operations described herein. In some embodiments, the user interface 124 may be configured according to certain rules, preferences, and/or functions. Furthermore, the operator 102 can customize the user interface 124 according to his/her desires, preferences, and/or requirements.

The camera 126 may be any appropriate image capturing device capable of scanning the barcode or QR code displayed on the device 110. The communication interface 128 may be a hardware device, a software program, or a combination thereof to connect the user device 120 to a wired network and/or a wireless network, such as, Ethernet interface, cellular interface, Wi-Fi interface, Bluetooth interface, or the like.

Still referring to FIG. 1B, in some embodiments, the service center 130 comprises the server 131 and the database 139. The service center 130 may be managed by, for example, a medical equipment manufacturer, a medical equipment sales company, or a maintenance service provider. In some embodiments, the service center 130 is cloud-based, leveraging computing and storing capacities in the cloud. The database 139 stores equipment service information associated with each piece of equipment 110, for example, an identification (e.g., serial number) and type of the piece of equipment 110, location, software version, services performed on the piece of equipment 110 and date/time of performance, services scheduled for the piece of equipment 110 and date/time, operators who performed and/or will perform the services, and so on.

The server 131 comprises a registry 132, a mobile application host 134, a message analyzer 136, and a message generator 138. The registry 132 registers various pieces of equipment 110 and the operator team 102 with the service center 130. Thus, the equipment 110 and operator team 102 are added to the service center 130 and stored, alone and/or as part of a hierarchy or organization structure of organization/sites/devices in the database 139. Each piece of equipment 110 can be associated with a device identifier in the registry 132, which can be used with information such as device name, model, type (e.g., MR, CT, X-ray), location, operational status (e.g., OK, error), etc. to create a device profile managed by the service center 130. Each operator 102 can be associated with an operator identifier in the registry 132, which can be used with information such as user name, phone number, email address, calendar, etc. to create an operator profile managed by the service center 130. In some examples, the registry 132 includes an authentication module for authenticating equipment 110 and operator 102. The database 139 may store device/operator credentials to facilitate the authentication.

The mobile application host 134 supports the mobile application 122 on the user device 120 to access the service center 130. The service center 130 can receive messages from and send messages to the user device 120 through the mobile application host 134. In some embodiments, the mobile application host 134 may authenticate the data from the user device 120. For example, the mobile application host 134 may check the credentials of the equipment 110 and operator 102 contained in the message and compare with the corresponding credentials stored in the database 139.

The message analyzer 136 analyzes the message received from the mobile application 122. In some embodiments in which the mobile application 122 does not have the function of extracting information from the barcode or QR code, the message analyzer 136 extracts information from the barcode or QR code. In some embodiments in which the mobile application 122 has extracted information from the barcode or QR code, the message analyzer 136 analyzes the extracted information. The message analyzer 122 determines what to do based on the information contained in the message. For example, if the received message indicates that the operator 102 has successfully performed a service event on the piece of equipment 110, the message analyzer 136 updates the database 139 with the type of service performed, status of performance (e.g., success), date/time of performance, etc. If the received message indicates that the piece of equipment 110 has been moved to another location, the message analyzer 136 updates the location in the database 139. If the message indicates that a regular service (e.g., calibration) is due, the message analyzer 136 schedules a service and appoints an operator for the upcoming service. If the message indicates that a service has not been successfully performed (e.g., failed), the message analyzer 136 may identify the cause of the failure. If the message indicates that the operation of the piece of equipment 110 is abnormal, the message analyzer 136 analyzes the error code to identify the cause. It should be noted that the types of messages described herein are for illustration not for limitation, the message can contain any appropriate information.

The message generator 138 generate a return message to the user device 120 based on the analysis by the message analyzer 136. For example, if the service has been successfully performed and no further action is needed, the message generator 138 may generate a key for resuming the device 110. The key can be, for example, numbers, letters, characters, or any combination thereof. If a service is not successfully completed and/or error code indicates abnormal operational status, the message generator 138 may generate a return message that contains warnings of the problem, or instructions regarding further personal intervention, etc., along with the key.

Figure 2:
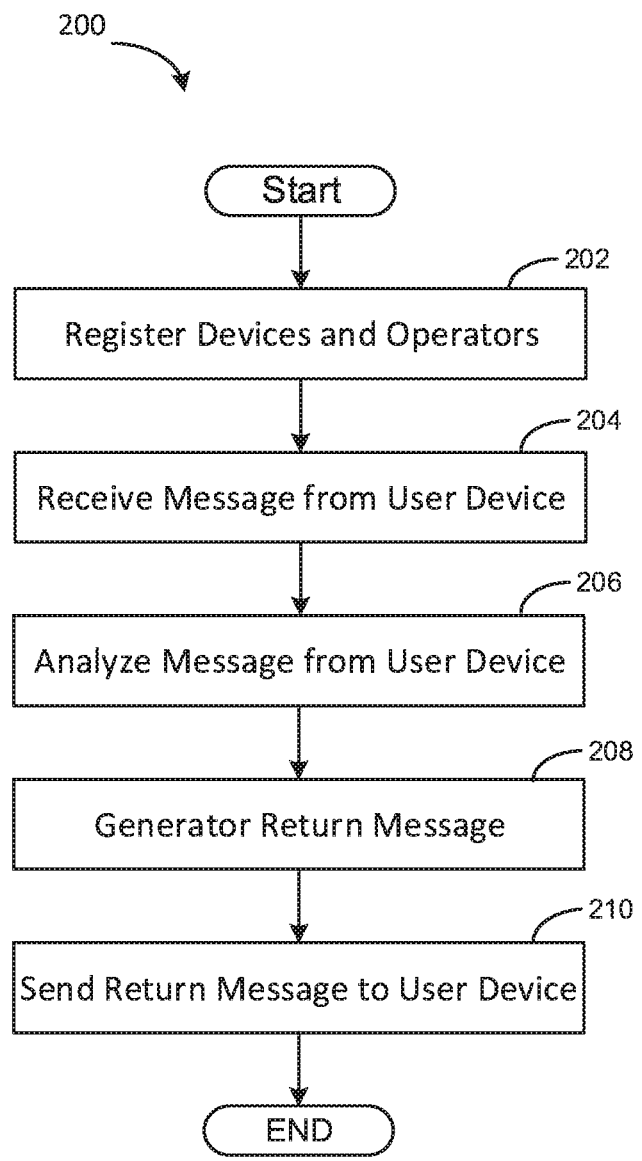
FIG. 2 illustrates a flow diagram of an equipment service process performed at a service center, in accordance with an exemplary embodiment.

FIG. 2 illustrates a flow diagram of an equipment service process 200 performed at the service center 130, according to an exemplary embodiment. At operation 202, equipment 110 and operator team 102 are registered with the registry 132 of the service center 130. For example, various pieces of equipment 110 and operators 102 are added to the service center 130 and stored, alone and/or as part of a hierarchy or organization structure of organization/sites/devices in the database 139. Each piece of equipment 110 can be associated with device identifiers, which can be used with information such as device name, type, model, location, status (e.g., OK, error), and the like to create a device profile. Each operator 102 can be associated with an operator identifier, which can be used with information such as user name, phone number, email address, calendar, etc. to create an operator profile.

At operation 204, the mobile application host 204 receives a message from the user device 120. In some embodiments, the message includes the barcode or QR code generated by the device 110 in response to a triggering event. In some embodiments, the message includes information extracted from the barcode or QR code. Besides, the message may further contain the type and identification (e.g., serial number) of the piece of equipment 110, its location, identification of the operator 102, the type of the triggering event, etc. In further embodiments, the mobile application host 134 may authenticate the message received from the user device 120. For example, the mobile application host 134 may check the credentials of the piece of equipment 110 and operator 102 contained in the message and compare with the corresponding credentials stored in the database 139.

At operation 206, the message analyzer 136 analyzes the message received from the user device 110. If the received message contains the barcode or QR code, the message analyzer 136 extracts information from the barcode or QR code. If the received message contains the extracted information, the message analyzer 136 analyzes the extracted information. The message analyzer 136 determines what to do based on the information contained in the message. For example, if the received message indicates that the operator 102 has successfully performed a service event on the piece of equipment 110, the message analyzer 136 updates the database 139 with the performed service. If the received message indicates that the piece of equipment 110 has been moved to another location, the message analyzer 136 updates the location in the database 139. If the message indicates that a regular service (e.g., calibration) is due, the message analyzer 136 schedules an upcoming service. If the message indicates that a service has not been successfully performed and/or the operational status is abnormal, the message analyzer 136 may identify the cause of the failure and/or analyze the error code.

At operation 208, the message generator 138 generates a return message based on the analysis by the message analyzer 136. For example, if the service has been successfully performed and no further action is needed, the message generator 138 may generate a key for resuming the piece of equipment 110. If a service is not successfully completed and/or the operation is abnormal, the message generator 138 may generate a return message that contains warnings of the problem, or instructions regarding further personal intervention, etc., along with the key.

At operation 210, the mobile application host 134 sends the return message generated by the message generator 138 to the user device 110.

It should be understood that the process described with reference to FIG. 2 is for purposes of illustration only and not for limitation. Any suitable equipment service process with more, fewer, and/or different operations can be implemented.

Figure 3:
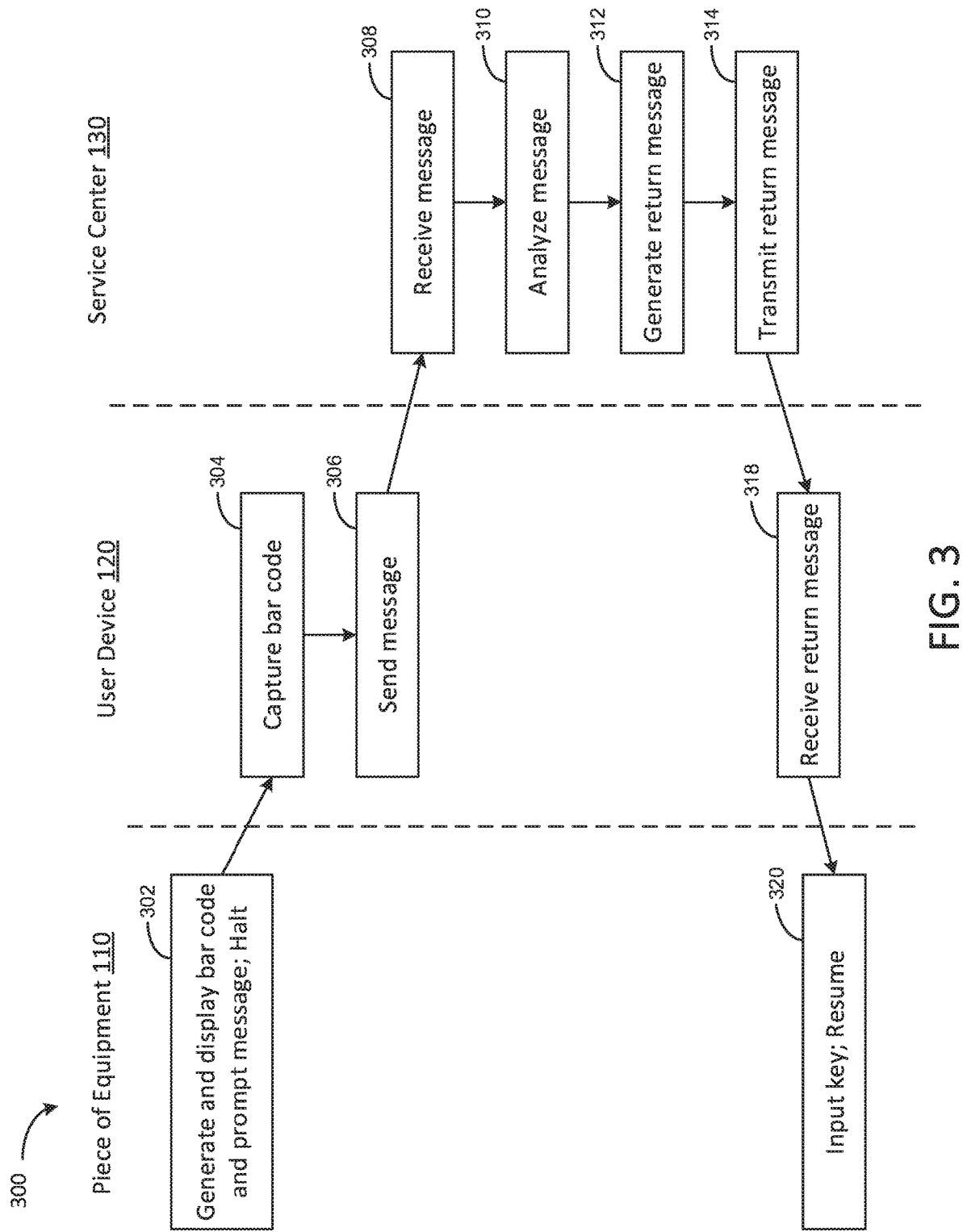
FIG. 3 illustrates a work flow of an equipment service process involving a piece of equipment, a user device, and a service center, in accordance with an exemplary embodiment.

FIG. 3 illustrates a work flow 300 of an equipment service process involving the piece of equipment 110, the user device 120, and the service center 130, in accordance with an exemplary embodiment.

At operation 302, the code generator 112 of the piece of equipment 110 generates a barcode or QR code in response to a triggering event. The triggering event may include performance of a service event, such as, installation of equipment, performance of preventive maintenance, update of software, periodic calibration and/or configuration of system, change of location, etc. The triggering event may also include an upcoming service event, for example, a periodic calibration due in a week, three days, or one day. The triggering event may further include abnormal operation of the piece of equipment 110, for example, when an error occurs. The triggering events may be predefined and stored in the piece of equipment 110.

The generated barcode or QR code may contain information of the piece of equipment 110, such as the type and identification (e.g., serial number), location, status of operation (e.g., OK, error, etc.), as well as information of the operator (e.g., identification). The barcode or QR code may further contain information of the triggering event, such as the type of the triggering event (e.g., periodic calibration, updates of software, etc.), details of the triggering event (failure, success, partial failure), timestamp of when the triggering event occurred, etc. In some embodiments, the barcode or QR code includes authentication data for authenticating the piece of equipment 110, for example, credentials of the piece of equipment 110. In some embodiments, information contained in the barcode or QR code is encrypted. In some embodiments, the piece of equipment 110 halts when the barcode or QR code and the prompt message are displayed.

When the operator 102 sees the displayed barcode or QR code and the prompt message, the operator 102 activates the mobile application 122 in the user device 120. Once activated, the user interface 124 prompts the operator 102 to scan the barcode or QR code. The camera 126 scans the barcode or QR code displayed on the device 110 at operation 304.

At operation 306, the mobile application 122 of the user device 120 then generates a message based on the barcode or QR code and sends the message to the service center 130 via the communication interface 128. In some embodiments, the mobile application 122 includes the function of extracting information from the barcode or QR code. The mobile application 122 sends the extracted information to the service center 130. In some embodiments, the message created by the mobile application 102 include the barcode or QR code itself. In further embodiments, the mobile application 120 adds information to the barcode or QR code or information extracted therefrom. The additional information may include, for example, an identification of the operator 102, location information determined by a GPS in the mobile device, timestamp of scanning and/or transmission, and the like. In some embodiments, the message is encrypted.

Operations 308-314 correspond to operations 204-210 in FIG. 3, separately. In particular, at operation 308, the mobile application host 204 receives a message from the user device 120. At operation 310, the message analyzer 136 analyzes the message received from the user device 110. At operation 312, the message generator 138 generates a return message based on the analysis by the message analyzer 136. At operation 314, the mobile application host 134 sends the return message generated by the message generator 138 to the user device 110.

At operation 318, the user device 120 receives the return message and displays the return message at the user interface 124.

At operation 320, the operator 102 inputs the key contained in the return message at the piece of equipment 110. Operation of the piece of equipment 110 resumes. In some embodiments, the return message includes instructions/warnings besides the key, the operator 102 may follow the instructions to perform further actions.

The process illustrated in FIG. 3 can be repeated, per triggering events. It should be understood that the equipment service process described with reference to FIG. 3 is for purposes of illustration only and not for limitation. Any suitable equipment service process with more, fewer, and/or different operations can be implemented.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

What is claimed is:

1. A piece of equipment comprising:
    a code generator configured to generate a barcode or QR code in response to a triggering event, wherein the barcode or QR code contains information of the piece of equipment and the triggering event;
    a display configured to display the barcode or QR code, wherein operation of the piece of equipment, that is functioning, halts in response to the triggering event and displaying of the barcode or QR code; and
    an input device configured to receive an input of a key, wherein operation of the piece of equipment resumes upon input of the key.

2. The piece of equipment of claim 1, wherein the triggering event includes at least one of installation of the piece of equipment, performance of preventive maintenance, update of software, periodic calibration and/or configuration of system, change of location, an upcoming service event, and abnormal operation of the piece of equipment.

3. The piece of equipment of claim 1, wherein the triggering event is predefined and stored in the piece of equipment.

4. The piece of equipment of claim 1, wherein the barcode or QR code includes information of at least one of identification of the piece of equipment, type, location, status of operation of the piece of equipment, type of the triggering event, status of the triggering event, timestamp of when the triggering event occurred.

5. The piece of equipment of claim 1, wherein the barcode or QR code further includes authentication data for authenticating the piece of equipment.

6. The piece of equipment of claim 1, wherein the display is further configured to display a prompt message asking for input of the key.

7. The piece of equipment of claim 1, wherein the display and the input device are integrated as a touch screen.

8. The piece of equipment of claim 1, wherein the input device is further configured to receive an instruction or a warning regarding unsuccessful performance of the triggering event or abnormal operation of the piece of equipment.

9. A service center comprising:
    a database storing information related to equipment services;
    a server communicably connected to the database and configured to:
        receive a message from a user device, wherein the message comprises information from a piece of equipment and a triggering event from the piece of equipment, wherein the information is identified from a barcode or a QR code that is generated in response to the triggering event, and wherein the piece of equipment halts in response to generating the barcode or the QR code;
        analyze the message and update the database with the received message;
        generate a return message, wherein the return message comprises at least a key, wherein the key in the message causes the piece of equipment to resume operation; and
        transmit the return message to the user device.

10. The service center of claim 9, wherein the piece of equipment is not directly connected to the service center through a network.

11. The service center of claim 9, further comprising a registry configured to register the piece of equipment.

12. The service center of claim 9, wherein the server is further configured to authenticate the message before analyzing the message.

13. The service center of claim 9, wherein the return message further comprises an instruction or a warning regarding unsuccessful performance of the triggering event or abnormal operation of the piece of equipment.

14. A method for equipment service, the method comprising:
    generating a barcode or QR code in response to a triggering event, wherein the barcode or QR code contains information of a piece of equipment and the triggering event which happened to the piece of equipment;
    displaying the barcode or QR code and halting operation of the piece of equipment in response to the triggering event and displaying of the barcode or QR code; and
    receiving an input of a key and resuming operation of the piece of equipment resumes upon input of the key.

15. The method of claim 14, wherein the triggering event includes at least one of installation of the piece of equipment, performance of preventive maintenance, update of software, periodic calibration and/or configuration of system, change of location, an upcoming service event, and abnormal operation of the piece of equipment.

16. The method of claim 14, wherein the barcode or QR code includes information of at least one of identification of the piece of equipment, type, location, status of operation of the piece of equipment, type of the triggering event, status of the triggering event, timestamp of when the triggering event occurred.

17. The method of claim 14, further comprising receiving an instruction or a warning regarding unsuccessful performance of the triggering event or abnormal operation of the piece of equipment.

18. A method for equipment service, the method comprising:
  receiving a message from a user device, wherein the message comprises information from a piece of equipment and a triggering event from the piece of equipment, wherein the information is identified from a barcode or a QR code that is generated in response to the triggering event, and wherein the piece of equipment halts in response to generating the barcode or the QR code;
  analyzing the message and updating a database with the received message;
  generating a return message, wherein the return message comprises a key, wherein the key in the message causes the piece of equipment to resume operation; and
  transmitting the return message to the user device.

19. The method of claim 18, wherein the piece of equipment has no network connectivity.

20. The method of claim 18, wherein the return message further comprises an instruction or a warning regarding unsuccessful performance of the triggering event or abnormal operation of the piece of equipment.

21. The piece of equipment of claim 1, wherein the barcode or the QR code comprises an operator identifier, wherein the operator identifier comprises a user name, an email address, calendar information, or a combination thereof.

* * * * *